US009838751B2

(12) United States Patent
Arcidiacono et al.

(10) Patent No.: US 9,838,751 B2
(45) Date of Patent: Dec. 5, 2017

(54) TRANSMISSION/RECEPTION OF MICROWAVE SIGNALS BROADCAST BY A SATELLITE WITH AN INTERACTIVE RETURN LINK USING A SPREAD SPECTRUM PROTOCOL

(71) Applicant: EUTELSAT S A, Paris (FR)

(72) Inventors: Antonio Arcidiacono, Paris (FR); Daniele Vito Finocchiaro, Paris (FR)

(73) Assignee: EUTELSAT S A, Paris (FR)

( * ) Notice: Subject to any disclaimer, the term of this patent is extended or adjusted under 35 U.S.C. 154(b) by 141 days.

(21) Appl. No.: 14/364,585

(22) PCT Filed: Dec. 6, 2012

(86) PCT No.: PCT/EP2012/074636
§ 371 (c)(1),
(2) Date: Jun. 11, 2014

(87) PCT Pub. No.: WO2013/087502
PCT Pub. Date: Jun. 20, 2013

(65) Prior Publication Data
US 2014/0301428 A1    Oct. 9, 2014

(30) Foreign Application Priority Data

Dec. 15, 2011    (FR) ...................... 11 61678

(51) Int. Cl.
*H04B 1/00*    (2006.01)
*H04N 21/643*    (2011.01)
(Continued)

(52) U.S. Cl.
CPC ............. *H04N 21/643* (2013.01); *H04B 1/69* (2013.01); *H04B 7/18523* (2013.01);
(Continued)

(58) Field of Classification Search
CPC .......... H04B 1/692; H04B 1/69; H04B 1/713; H04B 1/715; H04J 13/00
(Continued)

(56) References Cited

U.S. PATENT DOCUMENTS 6,133,846 A * 10/2000 Birkedahl ............ G05D 1/0077
370/225
6,141,337 A * 10/2000 Uta ........................ H04B 1/707
370/335

(Continued)

FOREIGN PATENT DOCUMENTS

| EP | 0 888 690 | 8/2001 |
|---|---|---|
| WO | WO 03/103300 | 12/2003 |
| WO | WO 2011/076791 | 6/2011 |

OTHER PUBLICATIONS

Universal Serial Bus Specification Revision 2.0; Apr. 27, 2000.*
(Continued)

*Primary Examiner* — James M Perez
(74) *Attorney, Agent, or Firm* — Pillsbury Winthrop Shaw Pittman LLP

(57) ABSTRACT

A transmission/reception installation for microwave radio signals, including a unit for transmission/reception including a receiver for receiving the electric signals from the conversion of radio signals received via a terrestrial or satellite link, referred to as forward-link signals, a demodulator for demodulating the electric signals using a first modulation/ demodulation protocol, a modulator for modulating electric signals using a second modulation/demodulation protocol that is different than the first protocol, the second protocol being a spread-spectrum protocol, the modulator modulating the signals demodulated by the demodulator, and a converter for converting the electric signals modulated using a spread-spectrum protocol into radio signals that can be transmitted via a satellite link. The installation also includes one or more (Continued)

boxes including a modulator for modulating the electric signals using the first modulation/demodulation protocol, and a coaxial cable connecting the unit for transmission/reception to the boxes.

22 Claims, 1 Drawing Sheet

(51) Int. Cl.
*H04B 7/185* (2006.01)
*H04N 7/20* (2006.01)
*H04N 21/61* (2011.01)
*H04B 1/69* (2011.01)

(52) U.S. Cl.
CPC ........... *H04N 7/20* (2013.01); *H04N 21/6112* (2013.01); *H04N 21/6143* (2013.01); *H04N 21/6162* (2013.01); *H04N 21/6193* (2013.01)

(58) Field of Classification Search
USPC ................................. 375/130–147
See application file for complete search history.

(56) References Cited

U.S. PATENT DOCUMENTS

| | | | | |
|---|---|---|---|---|
| 6,154,180 | A * | 11/2000 | Padrick | H01Q 9/14 343/722 |
| 6,160,820 | A * | 12/2000 | Isaksson | H04L 5/0007 370/294 |
| 6,272,166 | B1 * | 8/2001 | Dabak | H04B 1/707 370/335 |
| 6,370,603 | B1 * | 4/2002 | Silverman | G06F 13/385 709/220 |
| 7,257,102 | B2 * | 8/2007 | Min | H04L 27/38 348/E7.073 |
| 8,369,774 | B2 * | 2/2013 | Eberlein | H04H 20/06 455/12.1 |
| 8,432,808 | B1 * | 4/2013 | Dankberg | H04L 67/325 370/235 |
| 8,493,877 | B1 * | 7/2013 | Das | H04W 52/267 370/252 |
| 8,813,133 | B1 * | 8/2014 | DePrez | G06F 3/0481 725/61 |
| 8,862,049 | B2 * | 10/2014 | Arcidiacono | H04H 40/90 342/361 |
| 8,902,840 | B2 * | 12/2014 | Song | H04B 7/04 342/383 |
| 8,976,841 | B2 * | 3/2015 | Arcidiacono | H04B 1/707 375/141 |
| 9,319,172 | B2 * | 4/2016 | Jalali | H04L 1/0001 |
| 2001/0017846 | A1 * | 8/2001 | Wu | G06F 13/4086 370/257 |
| 2002/0004369 | A1 * | 1/2002 | Kelly | H01Q 1/1257 455/12.1 |
| 2002/0006118 | A1 * | 1/2002 | Rodriguez | H04B 7/1858 370/323 |
| 2002/0010821 | A1 * | 1/2002 | Yu | G06F 13/4045 710/100 |
| 2002/0079859 | A1 * | 6/2002 | Lumsden | H02P 27/02 318/727 |
| 2005/0068915 | A1 * | 3/2005 | Atad | H04N 21/472 370/316 |
| 2005/0149974 | A1 * | 7/2005 | Norman | H04N 7/17309 725/73 |
| 2005/0229235 | A1 * | 10/2005 | Loyer | H04N 5/4401 725/152 |
| 2007/0087690 | A1 * | 4/2007 | Karabinis | H04B 7/18515 455/12.1 |
| 2007/0280337 | A1 * | 12/2007 | Hays | H04B 1/7075 375/150 |
| 2008/0049659 | A1 * | 2/2008 | Ram | H04B 7/18582 370/316 |
| 2008/0092188 | A1 * | 4/2008 | Rofougaran | H04B 7/18582 725/111 |
| 2008/0120667 | A1 * | 5/2008 | Zaltsman | H04L 12/2856 725/110 |
| 2008/0144563 | A1 * | 6/2008 | Hart | H04B 7/18584 370/316 |
| 2008/0154961 | A1 * | 6/2008 | Dougall | G11B 27/034 |
| 2008/0222682 | A1 * | 9/2008 | Beales | H04H 20/63 725/70 |
| 2008/0295137 | A1 * | 11/2008 | Chen | H04B 1/18 725/70 |
| 2009/0135789 | A1 * | 5/2009 | Snapir | H04H 20/51 370/336 |
| 2009/0168916 | A1 * | 7/2009 | Song | H04B 7/04 375/267 |
| 2009/0190491 | A1 * | 7/2009 | Miller | H04B 7/18513 370/252 |
| 2010/0034219 | A1 * | 2/2010 | Stadelmeier | H04N 21/4385 370/478 |
| 2010/0054131 | A1 * | 3/2010 | del Rio Herrero | H04B 1/71072 370/236 |
| 2010/0218224 | A1 * | 8/2010 | Gat | H01Q 1/3275 725/72 |
| 2010/0251316 | A1 * | 9/2010 | Nicol | H04N 7/10 725/111 |
| 2010/0257259 | A1 * | 10/2010 | Snapir | H04L 47/10 709/221 |
| 2011/0091025 | A1 * | 4/2011 | Francisco | H04L 12/2834 379/93.02 |
| 2011/0176603 | A1 * | 7/2011 | Beeler | H04L 1/0003 375/240.02 |
| 2011/0296470 | A1 * | 12/2011 | Kurten | H04H 40/90 725/70 |
| 2012/0094593 | A1 * | 4/2012 | Burr | H04B 7/2041 455/12.1 |
| 2012/0204206 | A1 * | 8/2012 | Gutierrez Prieto | G06Q 20/16 725/31 |
| 2012/0282854 | A1 * | 11/2012 | Arcidiacono | H04H 40/90 455/3.02 |
| 2012/0300861 | A1 * | 11/2012 | Shen | H04L 1/0058 375/259 |
| 2013/0061276 | A1 * | 3/2013 | Urban | H04N 7/106 725/109 |
| 2013/0111523 | A1 * | 5/2013 | Seo | H04N 21/4135 725/39 |
| 2013/0114644 | A1 * | 5/2013 | Arcidiacono | H04B 1/707 375/145 |
| 2013/0166833 | A1 * | 6/2013 | Choi | H04N 21/426 711/104 |
| 2013/0227373 | A1 * | 8/2013 | Shen | H03M 13/29 714/755 |
| 2013/0251019 | A1 * | 9/2013 | Kolze | H04L 25/03885 375/232 |
| 2014/0057549 | A1 * | 2/2014 | Ling | H04H 20/74 455/3.02 |
| 2014/0181883 | A1 * | 6/2014 | Schroeder | H04N 21/436 725/116 |
| 2014/0196097 | A1 * | 7/2014 | Touret | H04N 21/236 725/67 |
| 2014/0198709 | A1 * | 7/2014 | Chang | H04B 7/18578 370/312 |
| 2015/0057881 | A1 * | 2/2015 | Raab | H04M 1/72536 701/36 |
| 2015/0146336 | A1 * | 5/2015 | Girard | H02H 9/08 361/119 |
| 2015/0214958 | A1 * | 7/2015 | Ramesh | H03L 1/00 331/34 |
| 2015/0264437 | A1 * | 9/2015 | Biewer | H04N 21/4622 725/64 |
| 2015/0280776 | A1 * | 10/2015 | Le Pera | H04B 1/7103 375/144 |
| 2015/0295987 | A1 * | 10/2015 | Finocchiaro | H04N 21/222 709/203 |

OTHER PUBLICATIONS

(56) References Cited

OTHER PUBLICATIONS

International Search Report issued for International Application No. PCT/EP2012/074636, dated Apr. 10, 2013.
Written Opinion of the International Searching Authority issued for International Application No. PCT/EP2012/074636, dated Apr. 10, 2013.

* cited by examiner

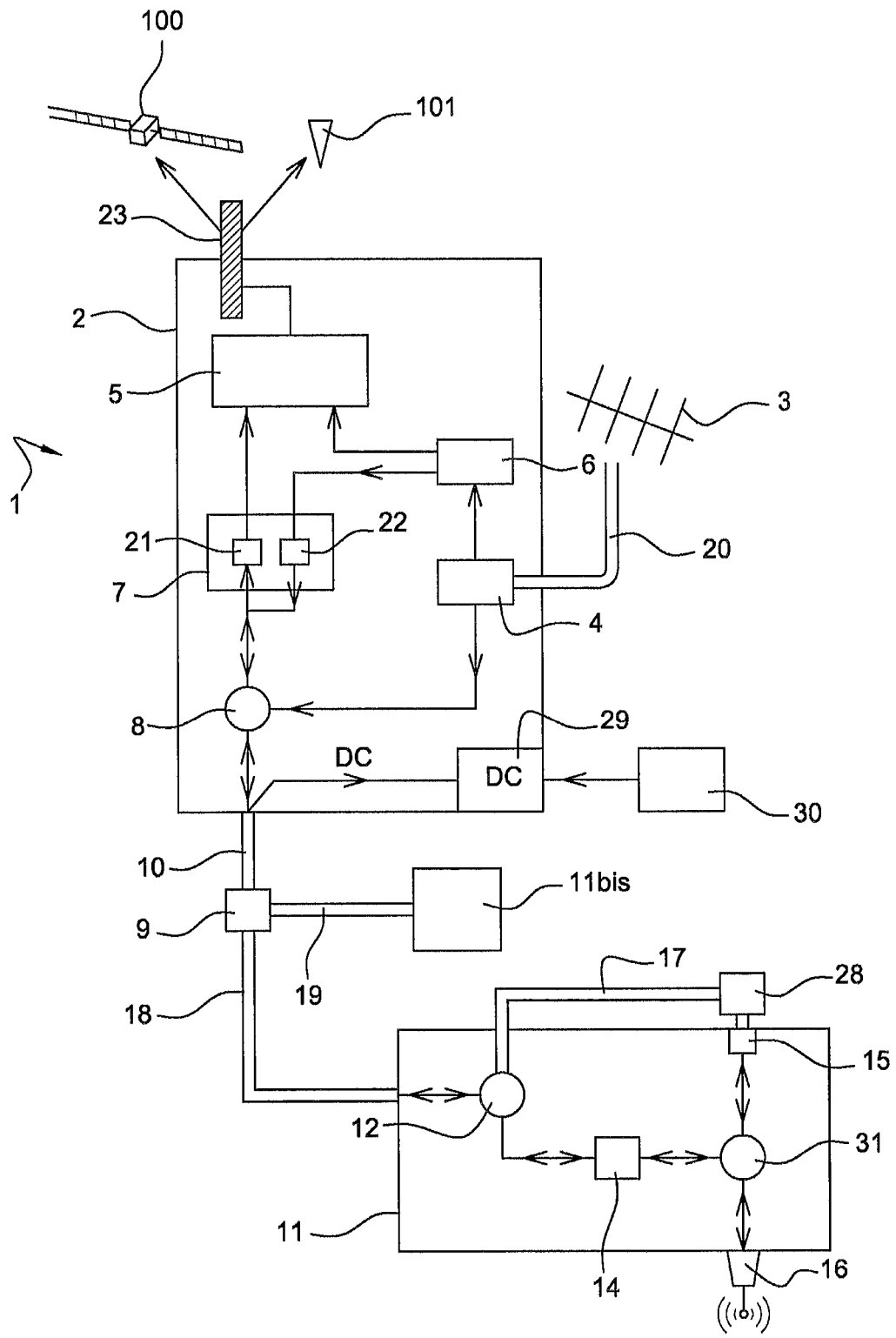

TRANSMISSION/RECEPTION OF MICROWAVE SIGNALS BROADCAST BY A SATELLITE WITH AN INTERACTIVE RETURN LINK USING A SPREAD SPECTRUM PROTOCOL

CROSS REFERENCE TO RELATED APPLICATIONS

This application is the U.S. National Stage of PCT/EP2012/074636, filed Dec. 6, 2012, which in turn claims priority to French Patent Application No. 1161678 filed Dec. 15, 2011, the entire contents of all applications are incorporated herein by reference in their entireties.

This invention relates to an installation for transmission/reception of microwave radio signals.

At the present time, digital television programs are broadcast by terrestrial links (for example using standard DVB-T or DVB-T2) or by satellite links (for example using standard DVB-S, DVB-S2 or DVB-SH) throughout the world. Many devices are installed in the homes of millions of users.

For terrestrial links, installed devices are mostly reception devices that comprise an outdoor unit including a reception antenna (for example a receiving "rake" antenna) that transmits modulated microwave radio signals to an indoor unit commonly called a Set Top Box (STB) through a coaxial cable.

For satellite links, most installed devices are receiving devices that comprise an outdoor unit including a parabolic reflector that focuses modulated microwave radio signals on the source called the horn of an LNB (Low Noise Block), the LNB transforming the received microwave radio signals into intermediate satellite band electric signals in order to transmit them through a coaxial cable to the satellite set top box STB.

For both terrestrial and satellite transmissions, the STB includes a demodulation module (DVB-T, DVB-T2, DVB-S, DVB-S2 or DVB-SH) that extracts a "useful" modulated signal in the modulated signal transmitted on the coaxial cable and demodulates the extracted "useful" signal. The demodulated "useful" signal may for example be used for displaying video images on a television screen.

Digital television program broadcasting services available through satellite or terrestrial links are essentially purely passive at the moment, in other words they are one-way services.

However, it is sometimes useful to be able to offer services requiring a return link; for example this is the case for interactive services (votes, consumption of conditional access contents through the exchange of keys, orders for new services such as video on demand). This return link can also be used in particularly interesting applications in the field of machine-to-machine (M2M) communications, or to control some equipment (alarm, heating, etc.) and/or recover data measured by sensors or meters (gas, electricity, etc.) present in homes.

One known solution to this problem consists of using a return link with an ADSL type connection provided by fixed telephony operators (Switched Telephone Network—STN) or a GPRS/UMTS type connection provided by mobile telephony operators. Therefore, this solution requires the use of additional equipment and an additional subscription; moreover telephone switching is not particularly suitable for the transmission of small volume messages such as vote or command messages (relatively high cost, network saturation problems, etc.).

For terrestrial broadcasting, the use of a more appropriate solution such as the DVB-RCT technology (described in European standard ETSI EN 301 958) failed due to the cost of the necessary infrastructure.

Most satellite television system services do not include a return link. However, there is the example of the two-directional satellite television broadcasting system disclosed in patent application EP0888690; this system uses a wide Ku band forward link and a narrow L band return link. This system is voluminous, complex and expensive in that it requires the presence of two reflectors (for the Ku band and for the L band) or a dedicated reflector comprising a reflector capable of receiving signals in the Ku band and integrating a transmission antenna in the L band. This system also requires the presence of two physical data routing links, one from the Ku band antenna to the STB inside the home and the other from the STB to the L band antenna. It can easily be understood that this type of installation requires a complete replacement of standard systems currently used in households and has a non-negligible extra cost.

Another example of a two-directional satellite television broadcasting system is disclosed in patent application WO2011076791 deposited by the applicant. This system uses a wide band Ku or Ka forward link and a narrow S band or C band return link, the signals being multiplexed on the same coaxial cable. The gain of the reflector to receive microwave radio signals in the Ku or Ka band is used to transmit signals on the return link in the S band or the C band. Despite amplification gains obtained with this solution, it is nevertheless true that the loss of power of the useful signal on the return link (particularly when passing through the coaxial cable) is high and therefore a sufficient amplifier is necessary at the outdoor unit. Furthermore, each box used inside the house has to be equipped with a modulator operating using an asynchronous random multiple access spread spectrum protocol using a SPREAD ALOHA type modulation, and this type of modulator is relatively expensive.

In this context, this invention is aimed at providing a microwave radio signal reception installation also capable of transmitting microwave radio signals in the return link with efficient performance, that is upgradeable, relatively inexpensive and easily adaptable to an existing installation serving one or several users.

For this purpose, the invention discloses an installation for transmission/reception of microwave radio signals comprising:
a unit for transmission/reception comprising:
    means capable of receiving electric signals output from the conversion of received terrestrial or satellite signals, called forward link electric signals;
    a demodulator capable of demodulating electric signals using a first modulation/demodulation protocol;
    an electric signal modulator using a second modulation/demodulation protocol different from said first protocol, said second protocol being a spread-spectrum protocol, said modulator modulating signals demodulated by said demodulator;
    means of converting said electric signals modulated using said spread-spectrum protocol called return link electric signals, into radioelectric signals that can be transmitted by satellite;
at least one box including a modulator capable of modulating electric signals using said first modulation/demodulation protocol;
a coaxial cable connecting the unit for transmission/reception and the box capable of:

transporting said forward link electric signals from said unit for transmission/reception to said box;

transporting electric signals output from said modulator using said first protocol from said box to said unit for transmission/reception.

With this invention, equipment using two types of modulation/demodulation can advantageously be used, for example modulation/demodulation based on a protocol adapted to short range wireless communication (ZigBee, KNX or others) for the first modulation/demodulation and modulation/demodulation based on a spread-spectrum protocol such as an asynchronous random multiple access spread spectrum protocol with a SPREAD ALOHA type modulation using interference elimination techniques (note that demodulation using these interference elimination techniques is used in the satellite hub and will not be described in further detail in this application). Short distance refers to a distance of less than 300 m and preferably less than 100 m. The box is advantageously a box located inside a building (i.e. in an apartment) and the transmission reception unit is advantageously located outdoors or close to the antenna. Thus, the transmission reception unit will recover a specific digital signal (contained in the modulated signal at the box) through its demodulator and modulate this digital signal through its modulator. The fact that a digital signal is reused at the outdoor transmission reception unit helps to eliminate noise and errors in the signal so that a low power amplifier can be used to amplify the modulated signal that contains very little noise.

The equipment uses a forward link for broadcasting signals to users that may be a terrestrial link (for example in a frequency band between 470 and 862 MHz) or a satellite link (for example in the Ku or Ka band) and a satellite return link (for example with a frequency band between 1.5 and 5 GHz, in other words frequencies in the S band, use of this frequency band not being limitative). It should be noted that the frequency band of the satellite return link will be chosen such that it is sufficiently far from the band used in the forward link (for example transmission in the S band and reception in the Ku band) such that there is no need to use a diplexer to avoid interference between the two links.

There are many advantages in such an equipment.

A proven technology is used in the forward broadcasting link to users for the transmission of large volume signals such as television signals and a satellite return link is used through which the user can interact with the broadcasting link and transmit fairly short messages, the modulation technique being based on a spread-spectrum protocol such as an asynchronous random multiple access spread spectrum protocol with SPREAD ALOHA type modulation. Such a protocol is described for example in document US2010/0054131 (del Rio Herrero et al.).

Furthermore, the means necessary for modulation based on a spread-spectrum protocol are installed only in the transmission reception unit, the user box(es) being equipped with a modulator using a modulation technique preferentially requiring implementation means with lower cost and lower complexity (modulation/demodulation adapted for wireless communication such as the ZigBee or KNX technology) than modulation means based on a spread-spectrum protocol. The advantage of such an equipment is that it only requires a single outdoor transmission reception unit and several boxes located indoors (for example in different apartments), said boxes having a relatively low production cost. The cost of the transmission reception unit can therefore be shared between several users. It should be noted that the fact that modulation/demodulation adapted to wireless communication such as the ZigBee or KNX technology is used on a coaxial cable means that this loss free technology can be used over a much longer cable length than if the communication took place in air.

It is very easy to adapt the system according to the invention (with little extra cost) onto an existing equipment because all that is necessary is to add the transmission reception unit (preferably outside the home) and the box (preferably inside the home) and connect them to the existing coaxial cable. Furthermore, the satellite signal transmission antenna is a very inexpensive and omni-directional antenna (i.e. means of transmission of microwave radio signals to a satellite) or an antenna with only weak directivity (for example an antenna gain of less than 10 dBi), and is easy to install. Depending on the frequency used, the signal emitted by the antenna can be received by a satellite or a terrestrial "collector". It should be noted that use of this antenna can be avoided if a satellite forward link is used, by using the parabolic reflector for transmission of the return link.

The low cost of the transmission reception unit is also due to the fact that two different bands are used for transmission and reception (for example transmission in S band and reception in Ku band), there is no need to use a diplexer to avoid interference between links.

It should also be noted that the system according to the invention is very upgradeable. It is quite feasible to consider starting by using the system in an enormous region (for example covering a complete country) and transmitting all return signals to a satellite without the deployment of any terrestrial component; when the satellite capacity is no longer sufficient, the service zone(s) in which most messages are sent is (are) identified. It then becomes possible to use terrestrial "collectors", in other words terrestrial reception stations acting as relays to reduce the satellite load, instead of using the antenna—satellite link directly. Signals transmitted by terminals at an appropriate frequency will then be received by collectors instead of the satellite. The capacity can thus be increased depending on needs, at a cost proportional to the number of installed terminals and with a progressive investment.

The forward terrestrial or satellite broadcasting link can be strongly integrated into the satellite return link because it may contain signalling information useful for correct operation of the equipment, in one of the transmitted multiplex signals. This information may include transmission parameters to be used (frequency, symbol rate, broadening code), the system load, security keys and other instructions for the equipment. Therefore, the unit for transmission/reception contains the logic necessary to interpret information present in the terrestrial or satellite broadcasting link and to use it to control transmission of the signals. Furthermore, the unit for transmission/reception can generate a very stable clock signal from the signal present in the forward link, for transmission with a very low frequency error—so that a very precise and expensive PLL is not necessary.

The installation according to the invention is particularly unexpected to those skilled in the art in the case of a forward terrestrial broadcasting link (hybrid equipment) in that it is difficult to imagine a hybrid terrestrial-satellite system with a satellite return link without a consequent addition of equipment inducing an unacceptable extra cost for the user. It is precisely the use of a specific modulation for communication between the unit for transmission/reception and the boxes, a second modulation for transmission to the satellite, an inexpensive antenna, and a single cable connecting the boxes in apartments with the outdoors unit for transmission/reception that makes the installation according to the invention attractive.

The transmission/reception installation according to the invention may also have one or several of the following characteristics considered individually or in any technically possible combination;

said electric signal modulator using a second modulation/demodulation protocol comprises means of using a spread-spectrum protocol operating according to an asynchronous random multiple access spread-spectrum protocol;

said first modulation/demodulation protocol is based on a protocol adapted to short range wireless communication such as ZigBee, KNX, WiFi, BlueTooth or WiMax;

said first modulation/demodulation protocol is based on a protocol adapted to a wire technology, for example Ethernet or the power line carrier PLC technology;

said unit for transmission/reception comprises means of extracting signalling information from forward link electric signals to set up transmission parameters and/or a clock signal;

said unit for transmission/reception comprises a demodulator of said electric signals in the forward link such as a demodulator capable of demodulating signals using one of the following standards:
DVB-T;
DVB-T2;
DVB-S;
DVB-S2;
DVB-SH;

said unit for transmission/reception and/or said box comprise wireless connection means such as WiFi, WiMax, BlueTooth, ZigBee or KNX means;

said return link electric signals are modulated in the so-called transmission frequency S band and more particularly in the [1980 MHz; 2010 MHz] band;

said means capable of receiving electric signals output from the conversion of radioelectric signals are capable of receiving terrestrial microwave radio signals in the UHF or VHF band;

said means capable of receiving electric signals output from the conversion of radioelectric signals are capable of receiving satellite microwave radio signals in the Ku band or the Ka band;

said unit for transmission/reception comprises means of sending said radioelectric signals that can be transmitted by satellite, to a satellite and/or to a terrestrial reception station;

said installation comprises a plurality of boxes exchanging signals with a single unit for transmission/reception.

Another purpose of this invention is a unit for transmission/reception that can be integrated into an installation according to the invention, said unit comprising:

means capable of receiving electric signals output from the conversion of radioelectric signals received by terrestrial or satellite means, called forward link electric signals;

a demodulator capable of demodulating electric signals using a first modulation/demodulation protocol;

an electric signal modulator using a second modulation/demodulation protocol different from said first protocol, said second protocol being a spread-spectrum protocol, said modulator modulating signals demodulated by said demodulator;

means of transforming said electric signals modulated using said spread-spectrum protocol, called return link electric signals, into radioelectric signals that can be transmitted by satellite.

It should be noted that even if the unit for transmission/reception is described mainly as a single device integrating all previously described functions, it may also be an arrangement of several different devices performing these functions: thus, it is possible to envisage that the means of transmission to the satellite (i.e. the antenna) are not directly integrated into a single device.

Another purpose of this invention is a box that can be integrated into an installation according to the invention comprising a modulator capable of modulating electric signals using said first modulation/demodulation protocol.

Other characteristics and advantages of the invention will become clear after reading the following description given for guidance and that is in no way limitative with reference to the appended FIGURE that diagrammatically shows an installation according to one embodiment of the invention.

FIG. 1 diagrammatically shows a transmission/reception installation 1 according to a first embodiment of the invention.

The transmission/reception installation 1 can operate with a standard terrestrial antenna 3 (for example a "rake" antenna located on the roof of a building or a dwelling) in order to receive signals in the UHF or VHF band comprising terrestrial digital television flows coded using a DVB-T or DVB-T2 type protocol.

The transmission/reception installation 1 comprises:
a unit for transmission/reception 2 outside the house;
a coaxial cable 10;
a microwave radio signal coupler/decoupler 9;
a plurality of boxes (in this case two boxes 11 and 11 bis are shown) that will be housed inside the building (for example each box is inside an apartment).

The terrestrial antenna 3 receives signals modulated using the DVB-T or DVB-T2 standard, for example in the UHF band (470-862 MHz band).

The unit for transmission/reception 2 comprises:
input means 4 capable of receiving terrestrial electric signals received by the antenna 3 (for example, the antenna and the input means 4 are connected by a coaxial cable 20);
a microwave radio signal coupler/decoupler 8;
a modem 7 operating with a first modulation/demodulation;
a modulator 5 operating with a second modulation/demodulation;
an omni-directional or quasi omni-directional antenna 23 (i.e. an antenna with low directivity, for example with an antenna gain less than 10 dBi) capable of transforming electric signals in the transmission S band (for example in the [1980 MHz-2010 MHz]) band into microwave radio signals and transmitting these signals to a satellite 100 or a collector 101 in the S band;
a demodulator 6.

For example, the modulator 5 operates using an asynchronous random multiple access spread spectrum protocol using SPREAD ALOHA type modulation optimised so that the satellite hub can use interference elimination methods (for example such a protocol is disclosed in document US2010/0054131 (del Rio Herrero et al.));

The modem 7 comprises a modulator 22 and a demodulator 21 and is generically a modem operating using an FSK (Frequency Shift Keying) or FSM (Frequency Shift Modulation) type protocol or a protocol derived from such a protocol; the modem 7 is preferably a modem operating using a protocol adapted to short range wireless communications (for example less than 300 m in wireless operation) such as a ZigBee or KNX modem.

The demodulator 6 operates using the DVB-T standard (described in ETSI standard EN 300 744, "Digital Video Broadcasting (DVB); Framing structure link coding and modulation for digital terrestrial television") or the DVB-T2 standard (described in ETSI standard EN 302 755 "Digital Video Broadcasting (DVB); Frame structure link coding and modulation for a second generation digital terrestrial television broadcasting system (DVB-T2)", extensions to the DVB-T2 standard such as DVB-T2-lite being described in "DVB BlueBook A122").

The box 11 comprises:
- a microwave radio signal coupler/decoupler 12;
- a modem 14 operating using the same protocol (first modulation/demodulation) as the modem 7; therefore the modem 14 is for example a ZigBee or KNX modem;
- wireless connection means 16 to a WiFi, WiMax, BlueTooth, ZigBee or KNX type local network, or wire connection means to an Ethernet or similar type local network; these means 16 can be used to receive signals transmitted to the modem 14;
- a USB type input/output connection 15 capable of exchanging signals with a digital television decoder 28, called a STB (Set Top Box);
- a coupler 31 that interconnects the modem 14 to the input/output connection 15 and to the wireless connection means 16 respectively. Box 11bis is identical to box 11.

The coaxial cable 10 connects boxes 11 and 11bis to the unit for transmission/reception 2.

The coaxial cable 10 is separated into two through the microwave coupler/decoupler 9 so that it connects the transmission reception unit 2 and the box 11 through the extension 18 of the cable 10 and the transmission reception unit 2 and the box 11 bis through the extension 19 of the cable 10, respectively. It should be noted that the microwave coupler/decoupler 9 is a device operating in two directions (i.e. it allows up and down radioelectric signals to pass). The same applies to other microwave couplers/decouplers in the installation.

Operation of the installation 1 will be explained with reference to exchanges between the unit for transmission/reception 2 and the box 11, it being understood that operation between the unit for transmission/reception and the box 11bis is identical.

The operating principle of the installation 1 according to the invention is based on the use of a terrestrial Hertzian reception part (without transmission) formed by the "rake" antenna 3 and the input means 4 capable of receiving terrestrial electric signals received by the antenna 3 and an S band transmission part.

The S band transmission part forms a return link for setting up interactive services (votes, consumption of conditional access contents by exchange of keys, orders for new services such as video on demand) or M2M services (control of domestic appliances, surveillance, monitoring of a parameter measured by a sensor) with relatively limited and inexpensive addition of equipment to an existing installation. The omni-directional antenna 23 can transmit S band signals either directly to the satellite 100 or to terrestrial collectors 101 if the capacity is increased (in this case, the antenna 10 can be made slightly directional to reach the collector 101).

All signals are coupled on the coaxial cable 10 alone.

Terrestrial signals received by the antenna 3 and then the input means 4 are transmitted by the hyperfrequency coupler/decoupler 8 on the coaxial cable 10.

These signals are then retrieved at the hyperfrequency coupler 12 before being transmitted to the STB 28 through a coaxial cable 17.

The signals to be transmitted in the S band are digital signals that are modulated by the modulator of the ZigBee modem 14 (i.e. first modulation/demodulation) of the box 11 on an intermediate frequency (for example 868 MHz or 2.4 GHz given simply for guidance). These return link signals may themselves be derived from signals originating from other appliances connected to the box 11 by wireless (through connection 16) or wire connection.

The modulated ZigBee signals are transmitted on the coaxial cable 18 through the coupler/decoupler 12 and then on the coaxial cable 10 by the coupler/decoupler 9 that transmits the signals to the unit for transmission/reception 2.

The coupler/decoupler 8 of the unit for transmission/reception 2 transmits modulated ZigBee signals to the demodulator 21 of the ZigBee modem 7.

The demodulator 21 recovers digital signals from the demodulated ZigBee signal. It should be noted that the demodulator 21 can use error correction means to eliminate noise inherent to the analogue signal transmitted on the cable.

Once the digital signals have been retrieved, they are modulated by the modulator 5 operating using the second modulation/demodulation using an asynchronous random multiple access spread spectrum protocol of the SPREAD ALOHA type on the S frequency band [1980 MHz-2010 MHz]. Since very "clean" digital information has been recovered, the modulated signal is not very noisy and requires only low amplification. It should be noted however that it could be envisaged to use a low power amplifier to amplify modulated signals that will be transmitted in the S band to the satellite 100 or the collector 101 through the antenna 23.

It should be noted that the chosen intermediate frequency band (for example 868 MHz) has the advantage that it is compatible with the passband of a standard coaxial cable and limits losses on the coaxial cable without needing to make a frequency transposition at the unit for transmission/reception. Furthermore, the fact of having an UHF band isolated from the 868 MHz frequency avoids interference between signals transmitted on the same cable. It should be noted that the use of another intermediate frequency in the UHF band, for example 430 MHz by the modulator of the ZigBee modem 14, might make a frequency conversion at the box 11 necessary so as to avoid interference on the cable 10 (for example using a local oscillator and a frequency mixer).

It should also be noted that the different couplers/decouplers may be provided with a filter so as to only recover the useful part of the frequency.

The UHF terrestrial reception forward link can also retrieve useful information. For example, this may be the frequency or the band width to be used in the S band return link. It may also be updated related to modulation/demodulation used by the modulator 5. In other words, the forward terrestrial broadcasting link may be strongly integrated into a satellite return link because the multiplex signals transmitted by the terrestrial link can contain signalling information useful for correct operation of the installation. This information may include transmission parameters to be used (frequency, symbol rate, spread code), the system load, security keys and other instructions for the installation.

Therefore to achieve this, the unit for transmission/reception 2 contains the logic necessary to interpret information present in the terrestrial broadcasting link and to use it to control the transmission of signals. This latter point assumes that the unit for transmission/reception comprises a demodulator 6 operating using DVB-T standard to extract signalling information used to produce return link transmission parameters present in part of the terrestrial electric signals, this information being transmitted to the modulator 5. The demodulator 6 may also send a very stable clock signal (for example with a frequency error of less than 1 ppm) to the modulator 5 (directly or through signal processing means not shown), used to transmit at the required frequency with a very low frequency error (for example less than 2 kHz).

It should be noted that the outdoor unit for transmission/reception 2 comprises a power supply 29; this DC power supply may be transmitted directly in the up link through the coaxial cable 10 (through extraction means of the unit 2 not shown). It is also possible to recharge the battery of the power supply 29 through one or several solar panels 30:

The energy consumption of the unit for transmission/reception 2 may be limited by supplying power to the modulator 5 (including the amplifier of signals to be transmitted when applicable) only when a signal needs to be transmitted. To achieve this, the unit for transmission/reception 2 comprises means of supplying power to the modem 5 only after the demodulator 7 has received a signal to be transmitted. For all applications in which the duty cycle is low (for example one message every minute), this arrangement means that energy is not consumed during periods when the messages are not transmitted.

A second particularly interesting application of the equipment according to the invention relates to the M2M topic. In this case, the S band return link may be used to transmit information from a device inside the house such as an alarm system; thus, when the alarm system is triggered, the alarm system transmits a signal to the wireless connection means 16 (for example means operating in ZigBee) and a message indicating that the alarm is started and transmitted on the S band return link.

According to one variant of the invention, a satellite broadcasting forward link can also be used as described in patent application WO2011076791 deposited by the applicant, instead of a terrestrial forward link. In this case, the rake antenna 3 and the input means 4 capable of receiving terrestrial electric signals received by the antenna 3 are replaced by a parabolic reflector and an LNB (Low Noise Block) reception unit for reception of signals output from a satellite (for example in the Ku band (10.7 GHz-12.75 GHz band). The LNB of the transceiver transforms the microwave signals received into electric signals in the satellite intermediate band so as to transmit them through the coaxial cable to the box.

In this case, the demodulator 6 operating using the DVB-T standard becomes a demodulator for example operating using DVB-S2 standard (ETSI EN 302 307 Digital Video Broadcasting (DVB); Second generation framing structure, link coding and modulation systems for Broadcasting, Interactive Services, News Gathering and other broadband satellite applications (DVB-S2)). According to this latter embodiment, the gain of the reflector used to receive microwave signals in the Ku band is advantageously used to transmit return link signals in the S band.

According to another variant of the invention, rather than using modems 7 and 14 operating using a protocol adapted to short range wireless communications (for example ZigBee or KNX), a wire technology such as Ethernet or a power line carrier PLC technology can be used. In this case, the modems 7 and 14 are replaced by PLC modems and each box communicates with other devices inside the house through the electricity network. PLC signals received by the box 11 are modulated by the modulator of the PLC modem at a frequency for example of between 1 and 20 MHz and are transmitted on the coaxial cable.

It should also be noted that the unit for transmission/reception may be provided with wireless or PLC transmission connection means to communicate with other devices, particularly when the transmission on the coaxial cable is not operational.

The rake antenna or the parabolic reflector is preferably a collective antenna or reflector used on the roof of an apartment building and is shared by several users each with their own box.

Obviously, the invention is not limited to the embodiment that has just been described.

Thus, the invention is described more particularly for use in S band but it may also be used in the C band.

The invention claimed is:
1. Installation for transmission/reception of microwave radio signals comprising:
   a unit for transmission/reception comprising:
      a receiver configured for receiving forward link electric signals output from the conversion of received terrestrial or satellite radioelectric signals;
      a first demodulator configured for demodulating electric signals, modulated at an intermediate frequency using a first modulation protocol and received from at least one box, using a first demodulation protocol;
      an electric signal modulator using a second modulation protocol different from said first demodulation protocol and from said first modulation protocol, said second protocol being a spread-spectrum protocol, said electric signal modulator modulating signals demodulated by said first demodulator; and
      a converter configured for converting said electric signals modulated using said spread-spectrum protocol into radioelectric signals that can be transmitted by satellite;
   said at least one box including a modulator configured for modulating electric signals at said intermediate frequency using said first modulation protocol; and
   a coaxial cable connecting the unit for transmission/reception and each of the at least one box, each of the coaxial cables being configured for:
      transporting said forward link electric signals from said unit for transmission/reception to said box;
      transporting electric signals output from said modulator using said first modulation protocol from said box to said unit for transmission/reception.

2. The installation according to claim 1, wherein said electric signal modulator using said second modulation protocol comprises means of using said spread-spectrum protocol operating according to an asynchronous random multiple access spread-spectrum protocol.

3. The installation according to claim 1, wherein said first modulation protocol and said first demodulation protocol are based on a short-range wireless communication protocol.

4. The installation according to claim 3, wherein said first modulation protocol and said first demodulation protocol are based on ZigBee, KNX, WiFi, BlueTooth or WiMax.

5. The installation according to claim 1, wherein said first modulation protocol and said first demodulation protocol are based on a protocol adapted to a wire technology.

6. The installation according to claim 5, wherein said first modulation protocol and said first demodulation protocol are based on Ethernet or power line carrier PLC technology.

7. The installation according to claim 1, wherein said unit for transmission/reception comprises means of extracting signalling information from forward link electric signals to set up transmission parameters and/or a clock signal.

8. The installation according to claim 1, wherein said unit for transmission/reception comprises a second demodulator of said electric signals in the forward link configured for demodulating signals using one of the following standards:
DVB-T;
DVB-T2;
DVB-S;
DVB-S2;
DVB-SH.

9. The installation according to claim 1, wherein said unit for transmission/reception and/or said box comprise wireless connection means.

10. The installation according to claim 9, wherein the wireless connection are WiFi, WiMax, BlueTooth, ZigBee or KNX means.

11. The installation according to claim 1, wherein said electric signals modulated using said spread-spectrum protocol are modulated in the transmission frequency S band or in the transmission frequency C band.

12. The installation according to claim 11, wherein the electric signals modulated using said spread-spectrum protocol are modulated in the [1980 MHz; 2010 MHz] band.

13. The installation according to claim 1, wherein said receiver is configured for receiving terrestrial microwave radio signals in the UHF or VHF band.

14. The installation according to claim 1, wherein said receiver is configured for receiving satellite microwave radio signals in the Ku band or the Ka band.

15. The installation according to claim 1, wherein said unit for transmission/reception comprises an emitter configured for sending said radioelectric signals that can be transmitted by satellite, to a satellite and/or to a terrestrial reception station.

16. The installation according to claim 1, wherein the unit for transmission/reception is located outdoors.

17. The installation according to claim 1, wherein the at least one box is a plurality of user boxes, each of the plurality of boxes being coupled together with the unit for transmission/reception via a microwave coupler/decoupler.

18. An outdoors unit for transmission/reception that can be integrated into an installation, comprising:
a receiver configured for receiving forward link electric signals output from the conversion of radioelectric signals received by terrestrial or satellite system;
a first demodulator configured for demodulating electric signals, modulated at an intermediate frequency using a first modulation protocol and received from at least one box, using a first demodulation protocol;
an electric signal modulator using a second modulation protocol different from said first demodulation protocol and from said first modulation protocol, said second protocol being a spread-spectrum protocol, said electric signal modulator modulating signals demodulated by said first demodulator; and
a converter configured for transforming said electric signals modulated using said spread-spectrum protocol into radioelectric signals that can be transmitted by satellite.

19. Installation for transmission/reception of microwave radio signals comprising:
a unit for transmission/reception comprising:
a receiver that, in use, receives forward link electric signals output from the conversion of received terrestrial or satellite radioelectric signals;
a first demodulator that, in use, demodulates electric signals, modulated at an intermediate frequency using a first modulation protocol and received from a box, using a first demodulation protocol;
an electric signal modulator using a second modulation protocol different from said first demodulation protocol and from said first modulation protocol, said second protocol being a spread-spectrum protocol, said electric signal modulator, in use, modulating signals demodulated by said first demodulator; and
a converter that, in use, converts said electric signals modulated using said spread-spectrum protocol into radioelectric signals that can be transmitted by satellite;
said box including a modulator that, in use, modulates electric signals at said intermediate frequency using said first modulation protocol; and
a coaxial cable connecting the unit for transmission/reception and the box that, in use,
transports said forward link electric signals from said unit for transmission/reception to said box;
transports electric signals output from said modulator using said first modulation protocol from said box to said unit for transmission/reception.

20. The installation according to claim 19, wherein said first modulation protocol and said first demodulation protocol are based on a short-range wireless communication protocol.

21. The installation according to claim 19, wherein said first modulation protocol and said first demodulation protocol are based on a protocol adapted to a wire technology.

22. The installation according to claim 19, wherein said unit for transmission/reception comprises a signal extracting device that, in use, extracts signals information from forward link electric signals to set up transmission parameters and/or a clock signal.

* * * * *